United States Patent

[11] 3,522,765

| [72] | Inventors: | Bruce K. Johnson |
| | | Andover, Massachusetts; |
| | | Otto. E. Wolff, Lexington, |
| | | Massachusetts |
| [21] | Application No.: | 673,574 |
| [22] | Filed: | Oct. 9, 1967 |
| [45] | Patented: | Aug. 4, 1970 |
| [73] | Assignee: | Polaroid Corporation |
| | | Cambridge, Massachusetts |
| | | a Corp. of Delaware |

[54] PHOTOGRAPHIC EXPOSURE CONTROL APPARATUS
10 Claims, Drawing Figs.

| [52] | U.S. Cl. | 95/60 |
| [51] | Int. Cl. | G03b 9/16 |
| [50] | Field of Search | 95/60 |

[56] References Cited
UNITED STATES PATENTS

| 2,179,718 | 11/1939 | Fedotoff | 95/60 |
| 2,493,195 | 1/1950 | Henne | 95/60 |
| 2,731,895 | 1/1956 | McKee | 95/60 |
| 3,208,365 | 9/1965 | Cooper | 95/60 |

*Primary Examiner*— John M. Horan
*Attorney*—Brown and Mikulka, William D. Roberson and James L. Neal

ABSTRACT: This disclosure involves photographic exposure control apparatus having separate aperture opening and closing shutter blades and a control member movable between first and second positions. The apparatus further includes a first drive spring acting upon the opening blade and the control member and a second drive spring acting upon the closing blade and the drive member. Movement of the control member from its first to its second position winds the first and second drive springs and then causes exposure producing operation of the shutter blades under the influence of the wound springs.

Patented Aug. 4, 1970

INVENTORS
Bruce H. Johnson
and
BY Otto E. Wolff
Brown and Mikulka
and
James L. Neal
ATTORNEYS INVENTOR.
Bruce K. Johnson
and
Otto E. Wolff
BY Brown and Mikulka
and
James L. Neal
ATTORNEYS

U.S. PATENT 3,522,765
PHOTOGRAPHIC EXPOSURE CONTROL APPARATUS

BRIEF SUMMARY OF THE INVENTION

This invention contemplates an exposure control apparatus which facilitates ease of operation and minimizes the number of components necessary in construction thereof.

In the preferred embodiment, the apparatus of this invention includes an opening blade movable between aperture blocking and unblocking positions, a closing blade movable between aperture unblocking and blocking positions, and control means movable between first and second positions and continuously biased for movement toward the first position. A first drive spring acts upon the opening blade and the control means for biasing the opening blade for movement toward its aperture unblocking movement when the control means is in its second position and a second drive spring acts upon the closing blade and the control means for biasing the closing blade for movement toward its aperture blocking position when the control means is in its second position. When the control means is maintained in its first position according to its bias, a position hereafter referred to as the "rest" position is established. In the rest position, the control means functions to locate the opening and closing blades into their aperture blocking and unblocking positions, respectively.

In photographic exposure production, manually operated means is engaged to advance the control means against its bias from its first position toward and to its second position while the opening and closing blades are releasably retained in the positions obtained in the rest position. Movement of the control means toward the second position is effective to store energy in the first and second drive springs thus cocking the apparatus. When cocked, the opening and closing blades are biased for movement to their unblocking and blocking positions, respectively. Movement of the control means to its second position effects release of the opening blade to permit exposure aperture unblocking movement thereof, to thereby initiate an exposure interval. Subsequently, the closing blade is automatically released for movement to its aperture blocking position in timed relationship to release of the opening blade, to thereby terminate the exposure interval. After exposure production, the manually operated means is released to permit the bias upon the control means to return the apparatus to its rest position.

Thus, one manual operation of the exposure control apparatus is transformed from a rest position to a cocked position, operated to produce a photographic exposure and then returned to its rest position.

It is a primary object of this invention to provide a reliable and accurate exposure control apparatus.

It is another object of this invention to provide reliable and accurate exposure control apparatus wherein one manual operation cocks the apparatus for exposure producing movement and subsequently releases the apparatus to permit exposure producing movement.

Other objects of the invention will in part be obvious and will in part appear hereinafter.

DETAILED DESCRIPTION OF THE DRAWINGS

Figure 1:
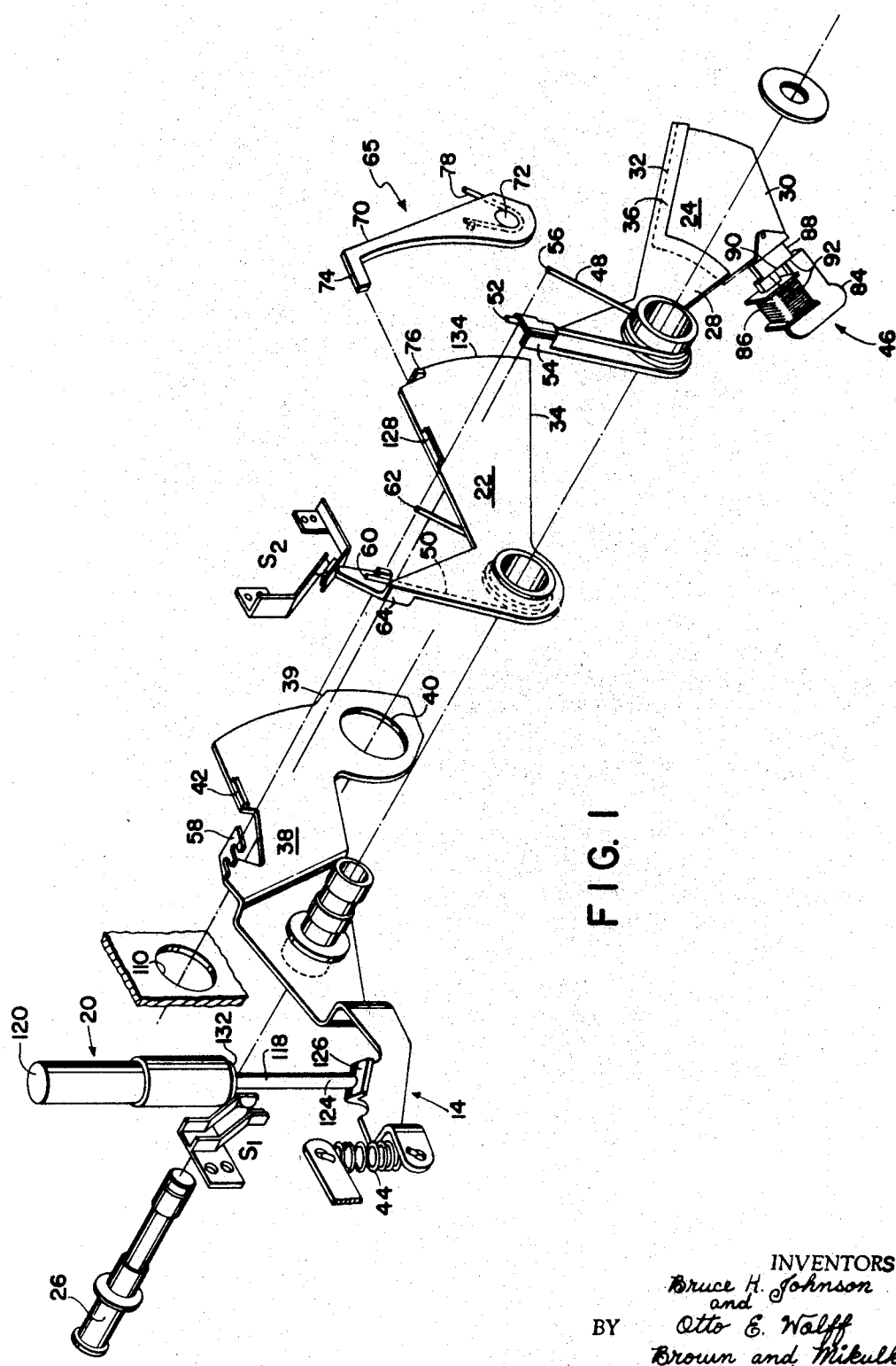
FIGURE 1 is an exploded perspective view of one embodiment of the exposure control apparatus of this invention.
Figure 3:
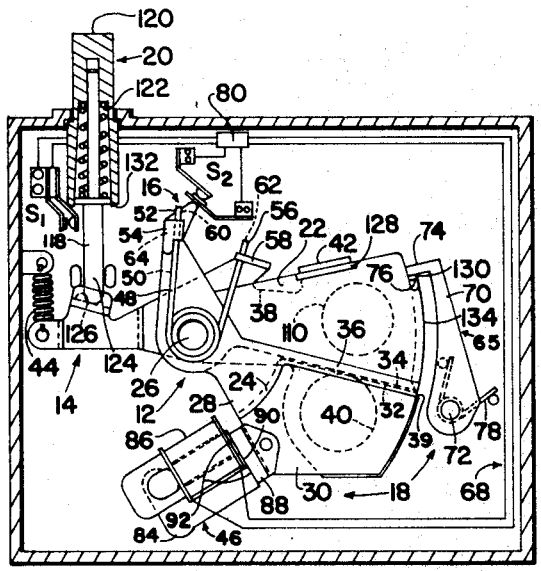
FIG. 3 shows the exposure control apparatus of FIGURE 1 in the rest condition.

Reference will now be made to FIGURE 1 wherein there is shown one embodiment of the exposure control apparatus of this invention in various stages of operation. The apparatus includes means 10 defining an exposure aperture, shutter means 12, control means 14, drive means 16, retaining means 18 and operating means 20.

Shutter means 12 includes opening blade means 22 and closing blade means 24, each pivotally mounted upon hub 26 for aperture blocking and unblocking movement. The closing blade means includes support portion 28 and blade portion 30. The support portion is pivotally mounted upon hub 26, in overlying relationship to opening blade means 22. Blade portion 30 is mounted upon support portion 28 so that it lies in coplanar relationship with blade 22. An edge of blade portion 30 defines surface 32 which abuts surface 34 of blade 22. Elongated portion 36 of support 75 forms a light seal along abutting surfaces 32 and 34.

Control means 14 comprises a capping blade 38 pivotally mounted upon hub 26 for movement between first and second positions. The capping blade forms cam 39 and aperture 40 and supports abutment 42. The abutment extends into the path of movement of the opening blade means and, due to the abutting relationship of the opening and closing blades, limits counterclockwise movement of both the opening and closing blades. Spring 44 continuously biases the capping blade in a clockwise direction toward its first position. When the capping blade moves toward its first position, abutment 42 engages opening blade 22 and urges the opening blade and closing blade 24 clockwise, toward their respective aperture blocking and unblocking positions. Electromechanical holding device 46 is positioned adjacent the aperture unblocking position of closing blade 24 for limiting clockwise motion. Since spring 44 continuously biases the control means in the clockwise direction, blade 24 is continuously and firmly pressed against the stop means, for reasons which will hereafter be described.

Drive means 16 includes drive springs 48 and 50 for blade 24 and blade 22, respectively. Spring 48 is coiled about hub 26 and includes end portion 52 which extends outwardly from hub 26 and engages closing blade 24 at 54 and end portion 56 which extends outwardly from the hub and engages control means 14 at 58. Similarly, spring 50 is coiled about the hub and includes end portions 60 and 62 which extend outwardly from the hub and engage opening blade 22 at 64 and control means 14 at 58, respectively. Drive spring 50 is preloaded to bias the opening blade for counter-clockwise rotation about the hub while biasing the capping blade for clockwise rotation, thus biasing the opening blade against the capping blade. Similarly, spring 48 is preloaded to bias the closing blade for counterclockwise rotation about the hub while biasing the capping blade for clockwise rotation so that the closing blade is biased against the opening blade. All three of the above described blades may be moved together, as a unit, without influencing the condition of drive springs 48 and 50; the condition of the drive springs being affected only when there is relative motion between the blades. The preloaded condition of the springs serves to maintain the elements in their proper relative positions when the apparatus is in the rest position.

Retaining means 18 incorporates separate holding mechanisms for opening blade 22 and closing blade 24. Latch means 66 releasably holds the opening blade in its aperture blocking position; photoresponsive retaining means 68 releasably holds the closing blade in the aperture unblocking position after release of the opening blade by latch means 66.

Latch means 66 includes arm 70 pivotally mounted upon pin 72, projection 74 extending from the end of arm 70 for releasably engaging an offset portion 76 of opening blade 22 and spring 78 for exerting counterclockwise bias upon arm 70.

Photoresponsive retaining means 68 may comprise, for example, timing circuit means 80 including photoresponsive element 82 (FIG. 2) and electromechanical holding device 46. The electromechanical holding device may involve an electromagnet including U-shaped core 84 and electrically energizable coil 86 wound around one leg of the core. The free ends of the core are coplanar and cooperable with magnetizable keeper 88 mounted upon closing blade means 24. The core of the electromagnet is positioned adjacent the aperture unblocking position of the closing blade means for contact with the keeper when the closing blade is in the aforesaid aperture unblocking position, the core and keeper being so arranged that surface 90 of the keeper contacts surfaces 92 of the U-shaped core to define a magnetic circuit. When the electromagnet is energized, a sufficient magnetomotive force is applied to the magnetic circuit to hold the keeper against the core and thus retain the closing blade in aperture unblocking position.

Figure 2:
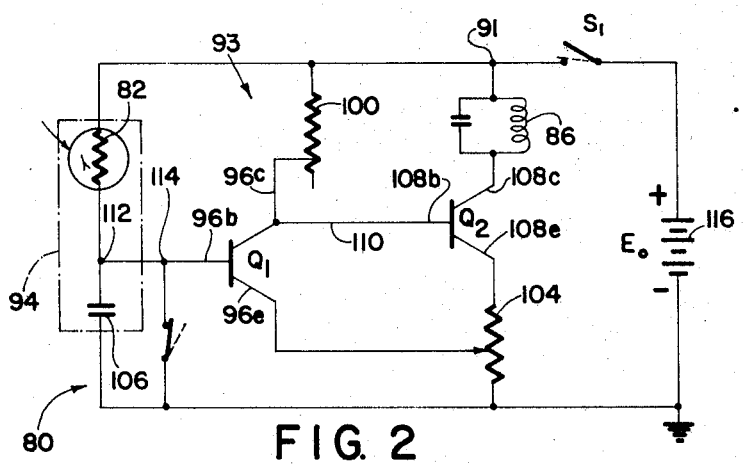
FIG. 2 is a schematic representation of a control circuit usable in conjunction with this invention.

One example of a timing circuit means suitable for use with the exposure control apparatus of this invention is shown in FIG. 2. Circuit 80 incorporates trigger circuit 93 and network 94.

Network 94 includes photoresponsive element 82, such as a cadmium sulfide photocell or the like, arranged to receive illumination from the scene being photographed and characterized by a resistance inversely related to the level of scene brightness. Element 82 connected in series with capacitor 106. Trigger circuit 93 may be, for example, a transistorized two stage Schmitt-type trigger circuit responsive to output voltage from network 94. Circuit 93 has a normally not-conducting stage that includes transistor $Q_1$ preferably of a silicon type, having base, collector and emitter electrodes 96b, 96c and 96e, respectively. Collector electrode 96c of $Q_1$ is connected to terminal 98 of the shutter timing apparatus by variable bias resistor 100, and emitter electrode 96e of $Q_1$ is connected to terminal 102 of the shutter timing apparatus by variable bias resistor 104. The base of transistor $Q_1$ is initially grounded through switch $S_2$ across capacitor 106. The normally conducting stage of circuit 93 includes transistor $Q_2$ having base, collector and emitter electrodes 108b, 108c and 108e, respectively. Collector electrode 108c is connected to terminal 98 through coil 86 so that the latter is energized when $Q_2$ conducts. Base electrode 108b of $Q_2$ is connected to collector electrode 96c of $Q_1$ through lead 110, and emitter electrode 108e of $Q_2$ is connected through bias resistor 104 to terminal 102. It should be noted that in this arrangement, resistor 104 is essentially a common emitter resistor. Adjustment to resistor 104 is for the purpose of establishing the voltage at which it is desired to trigger circuit 93. While the two stages of circuit 93 have been characterized as "normally not-conducting" and "normally-conducting" it should be obvious that this characterization is applicable only when a voltage source is applied across terminals 98 and 102.

Network 94 is connected between terminals 98 and 102 of the shutter timing apparatus so as to form a conventional integrator circuit, the input terminal of which is at 98 and the output terminal of which is between capacitor 106 and photoresponsive element 82 at connection 112. Connection 112 is connected by fixed impedance 114 to base electrode 96b of $Q_1$, the latter electrode constituting the input electrode of normally not-conducting stage.

Voltage source 116 is shown in the form of a battery of potential $E_0$ connected between terminal 102 and terminal 98 through normally open switch $S_1$. Voltage is applied across terminals 98 and 102 by operator means 20.

Operator means 20 includes shaft 118, knob 120 and spring 122. The shaft is mounted for reciprocal movement relative to hub 26; end 124 thereof engages with offset 126 of control means 14 for imparting counterclockwise rotation to the control means when the operator means is moved downwardly. Spring 122 biases knob 120 and shaft 118 in opposite directions axially of the shaft. Spring 122 is substantially weaker than spring 44 so that, upon depression of knob 120, the knob will move downwardly before movement is imparted to the shaft.

The events which occur as a result of downward movement of knob 120 and shaft 118 will now be described. Consideration will first be given to the operation of timing circuit means 80 and then to the sequential operation of the entire exposure control apparatus.

The downward movement of knob 120 which occurs prior to movement of shaft 118 effects closure of switch $S_1$. When switch $S_1$ is initially closed, network 94 is grounded so that the flow of current through resistors 100 and 104 establishes a reverse bias condition on the base-emitter junction of transistor $Q_1$ to cut the latter off.

The stage of circuit 93 incorporating transistor $Q_2$ includes base electrode 108b as the transistor input, collector electrode 108c as the transistor output, and emitter electrode 108e, common to the input and output. Resistor 100 coupled between input electrode 108b and terminal 98 acts as a fixed base resistor for providing, when $S_1$ is closed, a fixed base current bias that causes $Q_2$ to conduct instantaneously with closing of $S_1$. The setting of variable resistor 100 establishes the degree to which $Q_2$ conducts so that the current solenoid coil 86 can be adjusted to provide the proper magnetomotive force in the magnetic circuit of holding means 46, for preventing accidental release of closing blade 24 when the opening blade moves to aperture unblocking position to initiate exposure. The flow of current through resistors 100 and 104, when $Q_2$ conducts, establishes at the collector and emitter electrodes of $Q_1$, bias voltages having first values dependent upon the magnitudes of the respective currents and resistance values.

The contacts of $S_2$ are maintained in a closed condition until displacement of the opening blade out of its blocking position. Connection 112 is characterized by an initial value of voltage, namely ground potential, at the instant $S_1$ is closed and prior to the opening of $S_2$. When the voltage at connection 112 is at its initial value and the voltages at the collector and emitter electrodes of $Q_1$ are at their first values of bias voltage due to the conduction of $Q_2$, the collector-base and emitter-base junctions of $Q_1$ are reversed biased, thus cutting off transistor $Q_1$. For this reason, it may be said that the bias of $Q_1$ is primarily established by the voltage at connection 112.

During the interval after $S_1$ is closed and before $S_2$ is opened, the current through the solenoid builds rapidly to its maximum value causing the maximum retaining force to be exerted on the closing blade. The initial movement of the opening blade causes disengagement of the contacts of $S_2$, thereby opening the same to apply the voltage source across network 94 to activate the same.

The opening of $S_2$ causes network 94 to generate a voltage at connection 112. The voltage is of a value which causes $Q_1$ to be reverse biased and cut off; the value then changes with time, reaching a preselected value, termed the trigger voltage, which forward biases $Q_1$, in a period of time termed the trigger generation time.

When the time variable voltage at connection 112 reaches the trigger voltage, it causes the emitter-base junction of $Q_1$ to be forward biased. Element 82 then functions like a base resistor, the value of which is dependent upon the level of scene brightness, and provides base current bias that causes $Q_1$ to conduct, producing collector current at the output electrode thereof which flows through resistor 100 increasing the voltage drop thereacross, thus lowering the voltage at the input electrode of $Q_2$. This reduces the forward bias on $Q_2$, thus decreasing the flow of current through the latter and causing a reduction in the voltage drop across bias resistor 104 thereby increasing the forward bias on $Q_1$ even more. This regenerative feedback between the stages of voltage sensitive trigger circuit 93 will cause conduction to switch rapidly from $Q_2$ to $Q_1$. The different flows of current through bias resistors 100 and 104 after switching takes place establish second values of bias voltages at electrodes 96c and 96e of $Q_1$ such that the conduction of $Q_2$ is severely and rapidly reduced, thereby rapidly deenergizing coil 86. Deenergization of the coil effects rapid release of keeper 88.

Referring now to FIGS. 3 through 6, operation of the entire exposure control apparatus will be described. The apparatus is shown in the rest position in FIG. 3. Surface 34 of opening blade 22 abuts surface 32 of closing blade 24 so that clockwise movement of the opening blade produces similar movement of the closing blade. Spring 44 continuously biases the control means for clockwise movement. Abutment means 42 extends from the control means into engagement with surface 128 of the opening blade so that the clockwise bias of the control means also biases the opening and closing blades for the same movement. Core 84 of the electromagnet is located so that surfaces 92 thereof are contacted by surface 90 of keeper 88 upon blade 24 to limit clockwise movement of blades 22, 24 and 38 so that blades 22 and 38 are in aperture blocking position and blade 24 is in aperture unblocking position. Since spring 44 continuously biases the blades for clockwise movement, keeper 88 is continuously pressed into firm contact with surfaces 92 of the electromagnetic core. A small tolerance gap 130 is formed between the opening blade and latch means 66.

Figure 4:
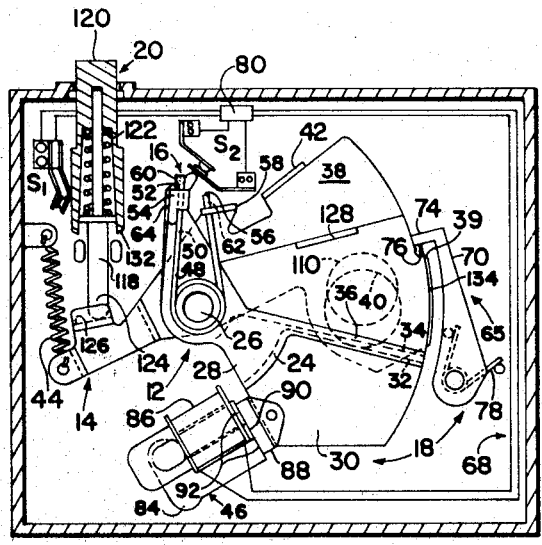
FIG. 4 is a view similar to FIG. 3 showing the apparatus in a cocked condition.

Referring now to FIG. 4 knob 120 is depressed to initiate exposure producing operation of the apparatus. Downward movement of the knob first causes switch operating cam 132 thereon to close the contacts of switch $S_1$. Closure of switch $S_1$ energizes circuit 80 and thus coil 86 of the electromagnet; keeper 88 is then magnetically held against core 84 for releasably holding closing blade 24 in its aperture unblocking position. Further downward movement of the knob effects downward movement of shaft 118. End 124 thereof engages offset 126 of control means 14 and rotates the control means counterclockwise from its first position toward its second position, against the bias of spring 44. Movement of the control means removes abutment means 42 from engagement with surface 128 of the opening blade. The opening blade moves slightly within its aperture blocking position to close gap 130 and is releasably held in aperture blocking position by latch means 66. Counterclockwise movement of control means 14, while movement of the opening and closing blade is arrested, "winds" drive springs 48 and 50 to store a predetermined amount of energy therein in addition to the energy stored therein due to this preloaded condition. Control means 14 ultimately reaches a position wherein cam surface 39 engages projection 74 of latch means 66. A further increment of movement carries the control means to its second position, shown in FIG. 5.

Figure 5:
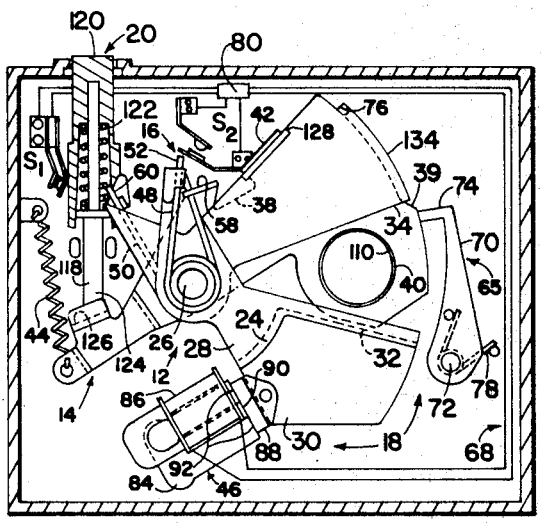
FIG. 5 is also a view similar to FIG. 3 showing the apparatus in the exposure producing condition.
Figure 6:
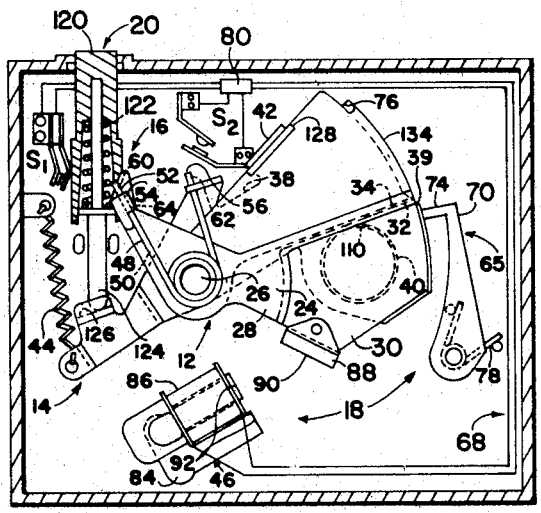
FIG. 6 is another view similar to FIG. 3 wherein the apparatus is shown in the post exposure condition, prior to its return to the rest condition.

Referring to FIG. 5, movement of the control means to its second position brings blade 38 to its aperture unblocking position and causes cam surface 39 to lift projection 74 of latch means 66 from offset portion 76 of opening blade 22 to release the opening blade for movement. The opening blade moves to its aperture unblocking position, under the influence of drive spring 50 to initiate an exposure interval. Movement of the opening blade opens switch $S_2$ and thereby activates network 94 of circuit means 80 to initiate the timing operation, as described above. At the conclusion of the timing operation when coil 86 is deenergized, keeper 88 is released to permit closing blade 24 to be driven to its aperture blocking position, under the influence of drive spring 48, to terminate the exposure interval. This condition is shown in FIG. 6.

After termination of the exposure interval, knob 120 is released. Spring 122 raises knob 120 relative to shaft 118; spring 44 rotates control means 14 in the clockwise direction toward and to its first position, and surface 126 of the control means lifts shaft 118 upwardly to its raised position. Upward movement of knob 120 opens switch $S_1$ and thus breaks circuit 80. During clockwise rotation of the control means, abutment means 42 engages surface 128 of opening blade 22 to rotate it in the clockwise direction toward and to its aperture blocking position and abutment surface 34 of the opening blade engages surface 32 of closing blade 24 to rotate it toward and to its aperture unblocking position. Return of the opening blade to its aperture blocking position returns switch $S_2$ to its closed condition.

Spring 44 exerts a continuous clockwise biasing force upon the control element; the control element in turn exerts a force upon the opening and closing blades for continuously urging keeper 88 into firm contact with core 84. It should be observed that during the respective clockwise movements of control means 14, opening blade 22 and closing blade 24, there is no relative movement between the aforesaid opening and closing blades and the control element. Thus, spring 44 does not have to exert a return force sufficient to overcome the forces of drive springs 48 and 50; it need only be strong enough to exert the requisite force for maintaining keeper 88 and core 84 in firm contact.

During return movement of the opening and closing blades and the control means, cam surface 39 of the control means moves out of engagement with projection 74 of arm 70 so that the projection is free to ride upon edge 134 of the opening blade until offset portion 76 of the opening blade passes beyond projection 74. Spring 78 then advances arm 70 in a counterclockwise direction so that projection 74 engages portion 76 of blade 22. The apparatus is thus returned to its original reset position and is ready for the production of a further photographic exposure.

Since human reaction time involved in depressing and releasing the shaft, and the inertial delay of the lever in returning to its normal position, substantially exceeds the longest average exposure apt to be used under normal "snapshot" conditions of scene brightness, the contacts of switch $S_1$ will be closed for at least as long as the correct exposure time.

Since certain changes may be made in the above apparatus without departing from the scope of the invention herein involved, it is intended that all matter contained in the above description or shown in the accompanying drawings shall be interpreted as illustrative and not in a limiting sense.

We claim:
1. Exposure control apparatus for a photographic camera comprising:
 (a) means defining an exposure aperture;
 (b) opening blade means mounted for movement between aperture blocking and unblocking positions;
 (c) closing blade means mounted for movement between aperture unblocking and blocking positions, said closing blade means supporting a magnetizable keeper;
 (d) control means mounted for movement between first and second positions, a portion of said control means being arranged to extend into the path of movement of said opening blade means and a portion of said opening blade means being arranged to extend into the path of movement of said closing blade means;
 (e) first drive spring means acting upon said opening blade means and said control means for biasing said opening blade means toward abutting relationship with said portion of said control means;
 (f) second drive spring means acting upon said closing blade means and said control means for biasing said closing blade means toward abutting relationship with said portion of said opening blade means, said control means being arranged to locate said opening blade means in its aperture blocking position and said closing blade means in its aperture unblocking position when at its first position and to locate said opening blade means in its aperture unblocking position and said closing blade means in its aperture blocking position when in its second position;
 (g) return spring means for continuously biasing said control means toward its first position;
 (h) retaining means for releasable holding said opening blade means in its aperture blocking position and said closing blade means in its aperture unblocking position during movement of said control means from its first toward its second position, said movement of said control means being effective to store energy in said first and second drive spring means, said retaining means comprising first means for releasably holding said opening blade means in its aperture blocking position during movement of said control means from its first toward its second position and second means for releasably holding said closing blade means in its aperture unblocking position during movement of said con- trol means from its first toward its second position, said second holding means comprising an energizable electromagnetic device including a core magnetizable by energization of said electromagnetic device, said core being arranged to present a surface for contact with said magnetizable keeper when said closing blade means is in its aperture unblocking position, said return spring means being effective to continuously urge said keeper into firm contact with said surface of said core when said control means is in its first position so that said core will magnetically engage said keeper when said control means is in its first position and said electromagnetic device is energized; and (i) means responsive to movement of said control means to its second position for causing said first holding means to release said opening blade means for movement from its aperture blocking position to its aperture unblocking position under the influence of said first drive spring means and subsequently causing said second holding means to release said closing blade means for movement to its aperture blocking position under the influence of said second drive spring means in timed relationship with movement of said opening blade means from its aperture blocking position.

2. Exposure control apparatus according to Claim 1 wherein said second holding means further comprises electronic timing circuit means responsive to the brightness of illumination of the scene being photographed for energizing said electromagnetic device prior to movement of said control means whereby said device magnetically engages said keeper to releasably hold said closing blade means in aperture unblocking position and subsequently deenergizing said electromagnet in timed relationship with release of said opening blade means for releasing said keeper and thus releasing said closing blade means for movement to aperture blocking position.

3. Exposure control apparatus for a photographic camera comprising:
   (a) means defining an exposure aperture;
   (b) an aperture capping blade mounted for rotation about an axis between an aperture blocking and an aperture unblocking position;
   (c) an aperture opening blade mounted for rotation about said axis between an aperture blocking and an aperture unblocking position;
   (d) an aperture closing blade mounted for rotation about said axis between an aperture unblocking and an aperture blocking position;
   (e) abutment means on said capping blade extending into the path of movement of said opening blade for influencing movement of said opening blade, said abutment means being arranged to locate said opening blade in its aperture blocking position when said capping blade is in its aperture blocking position;
   (f) abutment means on said opening blade extending into the path of movement of said closing blade for influencing movement of said closing blade means, the abutment means on said opening blade being arranged to locate said closing blade in its aperture unblocking position when said capping blade is in its aperture blocking position;
   (g) first pretensioned drive spring means acting upon said opening blade and said capping blade for biasing said opening blade against the abutment means on said capping blade;
   (h) second pretensioned drive spring means acting upon said closing blade and said capping blade for biasing said closing blade against the abutment means on said opening blade;
   (i) a latch positioned adjacent the path of movement of said opening blade for releasable engagement with said opening blade when said opening blade is in its aperture blocking position;
   (j) a magnetizable keeper mounted upon said closing blade;
   (k) electromagnetic retaining means located in the path of movement of said closing blade means for contact with said keeper when said closing blade is in its aperture unblocking position;
   (l) electrical circuit means for energizing and deenergizing said electromagnetic retaining means to magnetically engage and release said keeper, respectively;
   (m) a return spring for continuously biasing said capping blade toward its aperture blocking position and for continuously urging said keeper into firm contact with said electromagnetic retaining means when said capping blade is in its aperture blocking position;
   (n) first switch means in said electrical circuit means;
   (o) manually engageable means for operating said first switch means to energize said electromagnetic retaining means so that it magnetically engages said keeper and for subsequently advancing said capping blade against the bias of said return spring from its aperture blocking position to its aperture unblocking position while said opening blade is held in its aperture blocking position by said latch and said closing blade is held in its unblocking position by said electromagnetic retaining means, the advancing movement of said capping blade being effective to further tension said first and second drive springs;
   (p) means for disengaging said latch in response to movement of said capping blade into its aperture unblocking position to permit movement of said opening blade from its aperture blocking position to its aperture unblocking position under the influence of said first drive spring to thereby initiate an exposure interval; and
   (q) second switch means in said electrical circuit means, said second switch means being responsive to initial movement of said opening blade for effecting deenergization of said electromagnetic retaining means in timed relationship with said initial movement of said opening blade to permit movement of said closing blade from its aperture unblocking position to its aperture blocking position to thereby terminate said exposure interval;
   (r) said return spring being effective to return said capping blade to its aperture blocking position subsequent to termination of said exposure interval.

4. Exposure control apparatus for a photographic camera comprising:
   (a) means defining an exposure aperture;
   (b) control means mounted for movement between first and second positions;
   (c) opening blade means mounted for movement between aperture blocking and unblocking positions;
   (d) closing blade means mounted for movement between aperture unblocking and blocking positions;
   (e) first drive spring means acting upon said opening blade means and said control means for biasing said opening blade means and said control means toward and to a predetermined position relative to each other, said opening blade means being in its aperture blocking position when in said predetermined position relative to said control means and said control means is in its first position, said opening blade means being in its aperture unblocking position when in said predetermined position relative to said control means and said control means is in its second position;
   (f) second drive spring means acting upon said closing blade means and said control means for biasing said closing blade means and said control means toward and to a predetermined position relative to each other, said closing blade means being in its aperture unblocking position when in said predetermined position relative to said control means and said control means is in its first position, said closing blade means being in its aperture blocking position when in said predetermined position relative to said control means and said control means is in its second position;

(g) retaining means for releasably holding said opening blade means in its aperture blocking position and said closing blade means in its aperture unblocking position during movement of said control means from its first toward its second position, said movement of said control means being effective to store energy in said first and second drive spring means;

(h) means responsive to movement of said control means to its second position for causing said retaining means to release said opening blade means for movement from its aperture blocking position to its aperture unblocking position under influence of said first drive spring means wherein said opening blade means attains its said predetermined position relative to said control means and, subsequently, to release said closing blade means for movement to its aperture blocking position under the influence of said second drive spring means in timed relationships with movement of said opening blade means from its aperture blocking position, wherein said closing blade means attains its said predetermined position relative to said control means; and (i) biasing means adapted to return said control means to its first position subsequent to movement of said closing blade means to its aperture blocking position, said first and second drive spring means being effective to retain said opening and closing blade means in their respective predetermined positions relative to said control means during return of said control means to its first position whereby said opening and closing blade means are returned to their aperture blocking and unblocking positions respectively and whereby said biasing means operates to return said control means without working against either of said drive spring means.

5. Exposure control apparatus according to Claim 4 wherein said control means, opening blade means, and closing blade means are pivotally mounted for rotation about a common axis.

6. Exposure control apparatus for a photographic camera comprising:
(a) means defining an exposure aperture:
(b) aperture opening blade means mounted for movement between aperture blocking and unblocking positions;
(c) aperture closing blade means mounted for movement between aperture unblocking and blocking positions;
(d) a member movable between first and second positions;
(e) means for biasing said aperture opening blade toward its said unblocking position and for biasing said aperture closing blade toward its said blocking position responsive to movement of said member from its said first position to its said second position;
(f) first retaining means for releasably holding said opening blade in its aperture blocking position during movement of said member from its first toward its second position;
(g) second retaining means for releasably holding said closing blade means in its aperture unblocking position during movement of said member from its first toward its second position;
(h) means responsive to movement of said member to its second position for causing said first retaining means to release said opening blade means for movement to its aperture unblocking position under the influence of said biasing means; and
(i) means for releasing said closing blade means for movement to its aperture blocking position under the influence of said biasing means subsequent to movement of said opening blade means toward its aperture unblocking position.

7. Exposure control apparatus according to Claim 6 wherein said control means, opening blade means and closing blade means are pivotally mounted for rotation about a common axis.

8. Exposure control apparatus according to Claim 6 wherein said second retaining means comprises a magnetizable keeper mounted upon said closing blade and electromagnetic means arranged to present a magnetizable surface for contact with said magnetizable keeper when said closing blade means is in its aperture unblocking position, said keeper being magnetically engageable by said electromagnetic means when said electromagnetic means is energized.

9. Exposure control apparatus according to Claim 8 further comprising return spring means for returning said opening blade means, closing blade means and control means to their aperture blocking, aperture unblocking and first positions respectively and for continuously urging said keeper into firm contact with said magnetizable surface so that said keeper is conditioned magnetic engagement by said electro-magnetic means when said electromagnetic means is energized.

10. Exposure control apparatus according to Claim 9 wherein said control means, opening blade means and closing blade means are pivotally mounted for rotation about a common axis.